March 2, 1971 A. M. BUKEY 3,567,275
CONVERTIBLE STRUCTURE
Filed Feb. 10, 1969 10 Sheets-Sheet 1

INVENTOR.
ALBERT M. BUKEY
BY
ATTORNEY

March 2, 1971  A. M. BUKEY  3,567,275
CONVERTIBLE STRUCTURE
Filed Feb. 10, 1969  10 Sheets-Sheet 3

INVENTOR.
ALBERT M. BUKEY
BY
Anthony N. Cennans
ATTORNEY

INVENTOR.
ALBERT M. BUKEY
BY
ATTORNEY

INVENTOR.
ALBERT M. BUKEY

INVENTOR.
ALBERT M. BUKEY
ATTORNEY

March 2, 1971  A. M. BUKEY  3,567,275
CONVERTIBLE STRUCTURE
Filed Feb. 10, 1969  10 Sheets-Sheet 10
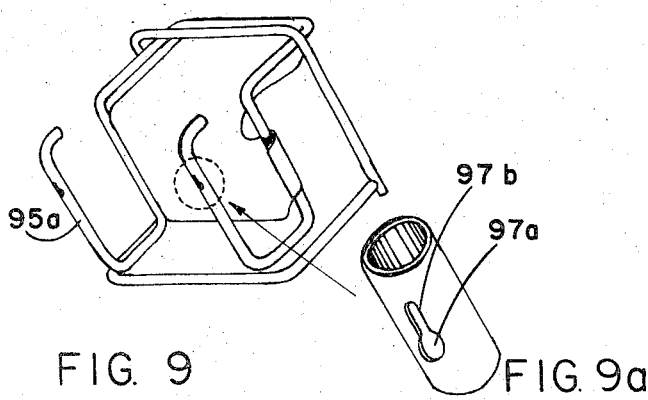
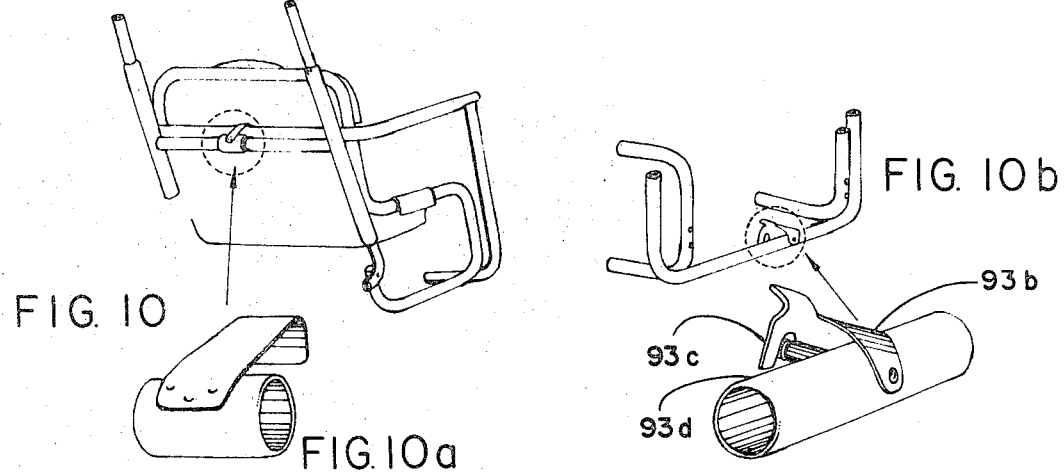
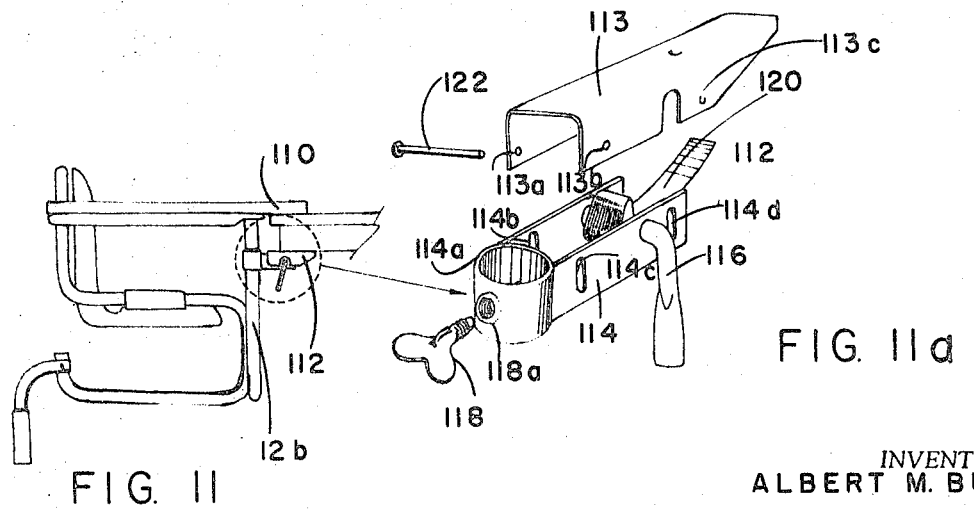
INVENTOR.
ALBERT M. BUKEY
BY
ATTORNEY United States Patent Office 3,567,275
Patented Mar. 2, 1971

3,567,275
CONVERTIBLE STRUCTURE
Albert M. Bukey, Rte. 1, Alexandria, Ohio 43001
Filed Feb. 10, 1969, Ser. No. 797,911
Int. Cl. A47c *13/00;* A47d *1/08, 1/04*
U.S. Cl. 297—133                              17 Claims

ABSTRACT OF THE DISCLOSURE

A convertible structure comprising three primary components and a minimum number of secondary components that permits the construction from a first utilitarian device into one of several others with only an insignificant number of changes.

BACKGROUND

The prior art is replete with baby type of furniture that is convertible from a high chair, to a car seat, to a crib, etc. Each of the prior art furniture structures suffer at least two significant problems that render them practically useless. The first is that if more than two devices are within the structure, the conversion of one to another is extremely complicated—generally beyond the comprehension of the ordinary mother/housewife. And, even if within her skills, the effort and work is far beyond that of a reasonable effort.

The second primary difficulty with the prior art devices is that they are extremely wieldy and unreliable to the point that a mother would not trust her child in it. If the structure is fortified to make it more secure, then the above-mentioned complication is further aggravated.

SUMMARY OF INVENTION

The present invention is a convertible structure having as its intended purpose a multifunction baby structure. Basically there are three primary components, i.e., a chair, a base, and a supporting structure, and only a relatively small number of accessory components. To convert from one piece of furniture to another the seat and the base remains unchanged (in most instances) and only the supporting structure needs to be manipulated. The components are interlocking either by interlocks or telescopes. The structure in converting from one piece of furniture to another is extremely simple requiring a very minimum number of changes—each being in itself readily made with only a small effort. Further, the structure is rugged and safe for any of its uses.

OBJECTS

It is accordingly a principal object of the present invention to provide a new and improved structure that is convertible from one utilitarian device to another with only a minimum of effort.

Another object of the present invention is to provide a convertible structure that comprises a relatively few components—and which components are interlocked with a minimum of effort.

Still another object of the present invention is to provide a convertible structure that is extremely rugged, that is reliable and safe for any use.

BRIEF DESCRIPTION OF DRAWINGS

Other objects and features of the present invention will become apparent from the following detailed description when taken in conjunction with the drawings in which:

FIGS. 9 and 9a illustrate one of the locking features the chair structure;

FIGS. 10, 10a, and 10b illustrate another locking feature of the chair structure;

FIGS. 11 and 11a illustrate another locking feature of the chair structure;

DESCRIPTION OF THE PREFERRED EMBODIMENT

Figure 1:
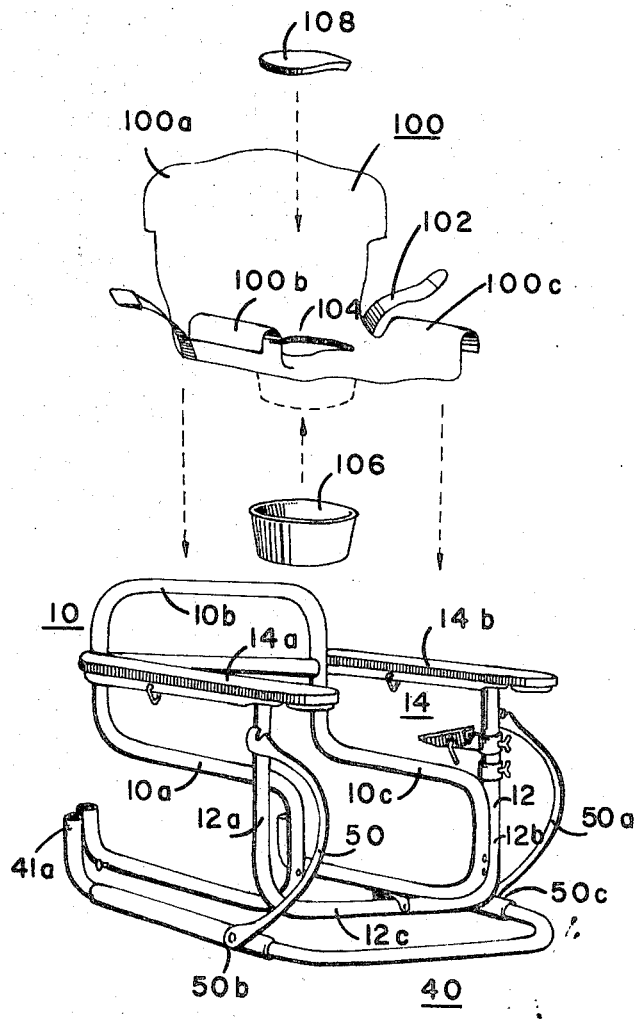
FIG. 1 illustrates the first basic component—the chair, with the second basic component the supporting structure in a first position.

Referring now specifically to FIG. 1 there is shown the first primary structure—the chair. The chair's main structure 10 is made up of a series of U-shaped elements. The first two U-shaped elements 10a and 10c are horizontal and parallel and made integral with the inverted U-shaped element 10b. Another U-shaped element 12 is upright and bridges the closed ends of U-shaped elements 10a and 10c, respectively, with arms 12a, 12b, and crosspiece 12c. Still another U-shaped element 14, also horizontal but in a cross direction to elements 10a and 10b, is attached to the vertical U-shaped element 10b at a midsection. In this way one leg of the U-shaped elements 10a and 10c form the supporting legs of the chair and the other leg of the U-shaped elements 10a and 10c form the seat support; the inverted U-shaped element 10b forms the back of the chair and the last of the U-shaped elements 14 forms the arm or tray rest for the chair.

The second primary structure is the support structure 40 shown in horizontal position in FIG. 1. In this embodiment of a baby chair, the support structure is folded "out of the way." The support structure 40 is also a U-shaped element and has its ends pivotally connected at the open ends of arms 41a and 41b to the open ends of U-shaped elements 10a and 10c. For a matter of convenience only, each of the U-shaped elements 41a, 41b, 10a and 10c have upturned open ends.

Figure 2:
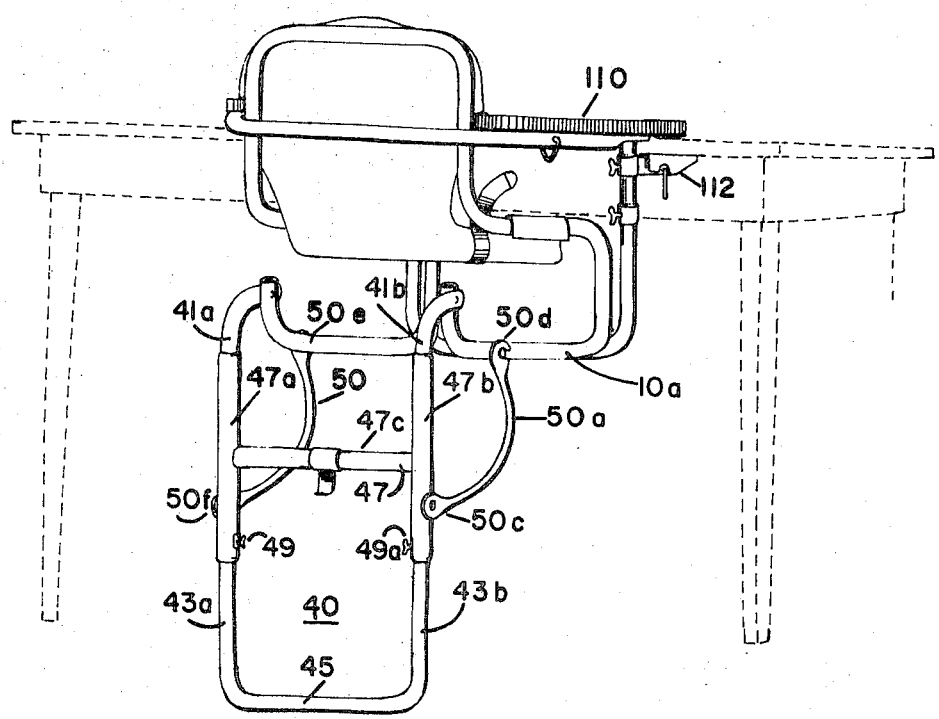
FIG. 2 illustrates the third basic component—the base structure, in an upright position.

The support structure 40 is shown more explicitly in FIG. 2. In this illustration the support structure 40 is in a vertical position—as more fully explained hereinafter, for supporting the baby chair of FIG. 1 at a regular table height. The support 40 generally comprises a U-shaped element with extended arms 43a and 43b and a base 45. A pair of upright pieces 47a and 47b together with cross piece 47c forms the H-shaped extension member 47. The lowermost portion of the U-shaped section 40 is severed at an intermediate point along the upright arms 43a and 43b. Bridging the severance is the H section 47 and particularly the upright pieces 47a, 47b. Specifically, the inside diameter of the pieces 47a and 47b is just enough greater than the outside diameter of the arm pieces 43a and 43b to cause a sliding or telescoping engagement therewith. Since it is not necessary, in most instances, to extend the support 40 to such a great extent, the upper portion of the pieces 47a and 47b are securely fastened—such as brazing, to the arm pieces 41a and 41b. On the lowermost ends of the upright pieces 47a and 47b there is formed, by drilling and tapping, threaded holes for insertion of the stop bolts 49 and 49a. At points 50f and 50c—somewhat between the stop bolts 49 and 49a and the cross piece 47c—there is pivotally connected, respectively, arcuate members 50 and 50a. These members 50 and 50a are in a preferred embodiment made of rod-like material with their two ends flattened out. In one of the flattened ends—such as, at 50c, there is formed an aperture for receipt of the pivotable connection as set forth above. At the opposite flattened ends 59d and 59e there is formed a hook to engage a bolt in threaded engagement with the lower arms 10a and 10b of the seat primary section. Alternate ways of connecting the ends 59d and 59e there is formed a hook to engage a bolt in threaded engagement with the lower arms 10a and 10b of the seat primary section. Alternate ways of connecting the ends 59d and 59e to arms 10a and 10b are within the invention.

Figure 3:
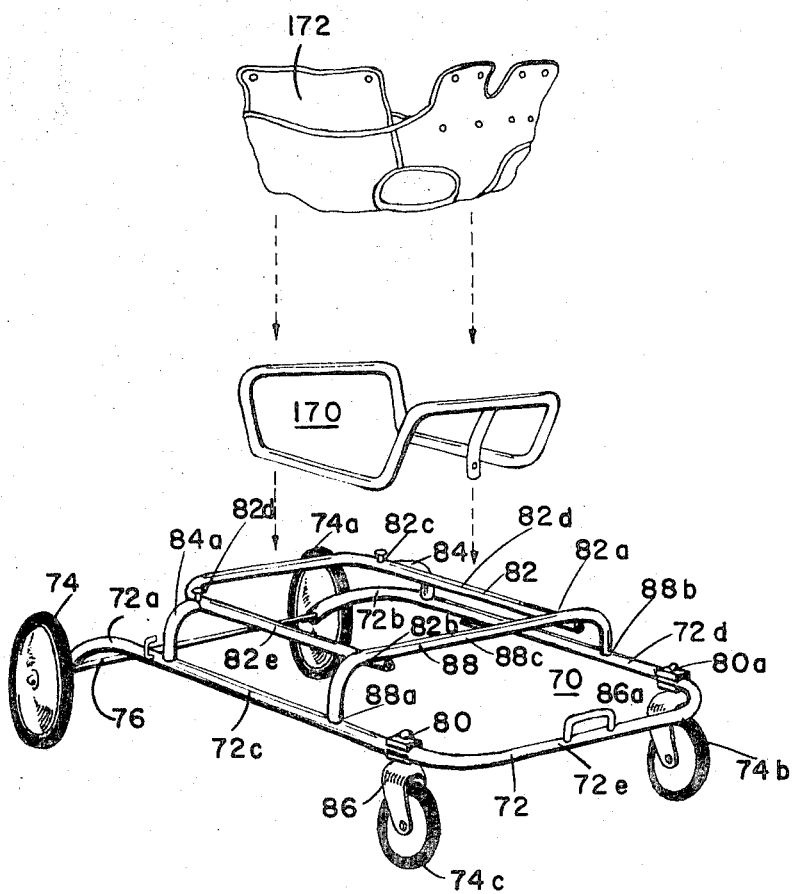
FIG. 3 illustrates more specifically the second major component—the supporting structure, in a vertical supporting position with the seat.

With reference to FIG. 3 there is shown the third primary section, the base 70. Again this section—just as the other two primary sections—are simple and of clean construction. Specifically, this structure is made up of a pair of U-shaped members, a C-shaped member, supporting members and wheels that are combined to form a frame or boxlike structure. The supporting part of the base is the U-shaped support 72. The ends 72a and 72b are slightly curved downward—with a total curvature equal to approximately the radius of the wheels 74 and 74a. Near the ends of 72a and 72b there is formed an aperture to receive the cross member 76 that serves also as the axis of the wheels 74 and 74b. In a foremost region of the arms 72c and 72d, adjacent the end of arm 72e there is clamped on a pair of wheels 74b and 74c. The clamps 80 and 80a securely hold, by brackets 86 and 86a wheels 74b and 74c.

Approximately one-third of the distance rearwardly of the wheels 74b and 74c on the arms 72c and 72d there is fixedly positioned a C-shaped member 88, by joining open ends at 88a and 88b thereto. Extending rearwardly from the C-shaped member 88 is the U-shaped member 82 with its open-ended arms joined to the C-shaped member 88 at 82a and 82b. The arms 82d and 82e are sufficiently long to extend to almost the rear wheels 74 and 74a. To support the U member 82 in a raised horizontal position, the ends thereof are joined to the rearward section of the arms 72c and 72d by supports 84 and 84a. They may be securely fastened by brazing.

Figure 4:
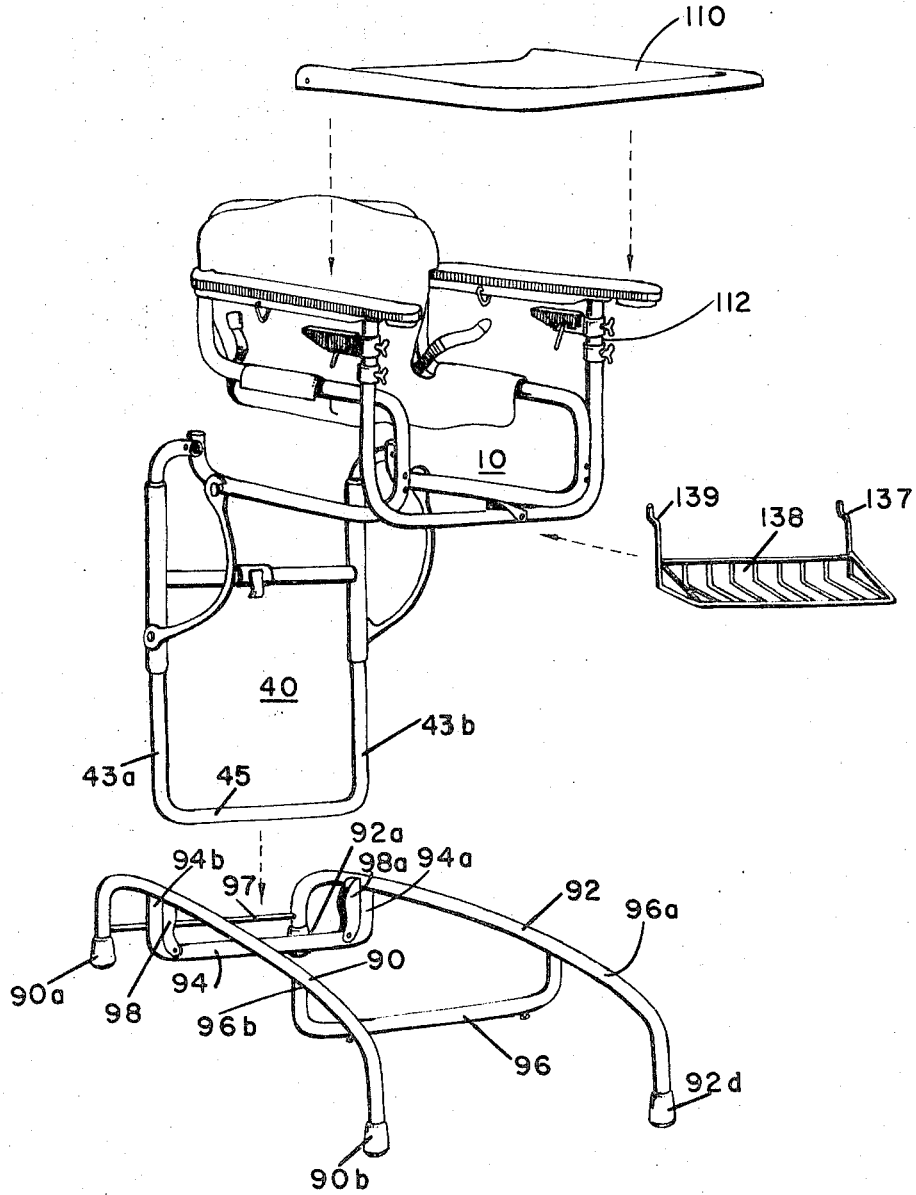
FIG. 4 illustrates an alternative base structure in an upright position and adapted to receive the supporting structure.
Figure 12:
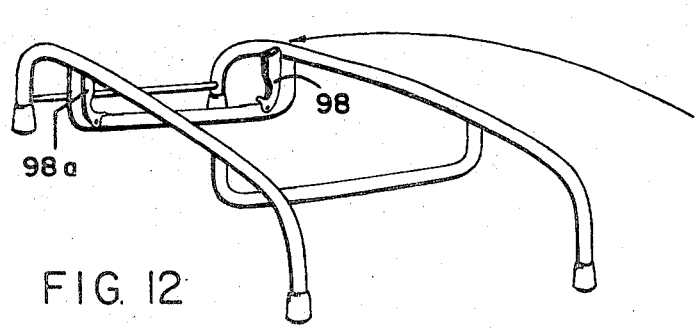
FIGS. 12 and 12a, illustrate an interlock feature of the second base structure; and, FIGS. 13 and 13a illustrate a locking feature of the first base structure.
Figure 12A:
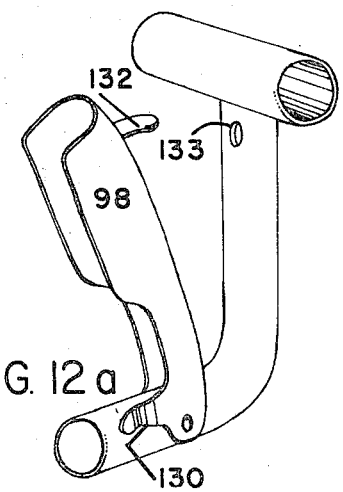

An alternative base structure is shown in FIG. 4. The structure comprises primarily four C-shaped elements 90, 92, 94, 96. The supporting elements are the inverted elements 90 and 92. Bridging these supporting elements are the C-shaped elements 94 and 96. These bridging elements 94 and 96 are spaced apart at a distance as described hereinafter and have their open ends securely joined to the underside of the elements 90 and 92 at points 94a and 94b and 96a and 96b. To prevent the C-shaped elements from collapsing inwardly, a supporting bracket 97 is joined to the lowermost region of the two C-shaped elements 90 and 92. To prevent scuffing of the floors and to eliminate skidding, footers 90a and 90b and 92a and 92b are placed over the ends thereof to rest on the floor. As more fully described relative to FIG. 12a a pair of receiving brackets 98 and 98a are pivotally joined to the underside of the C-shaped element 94 at the two extreme ends thereof.

Figure 5:
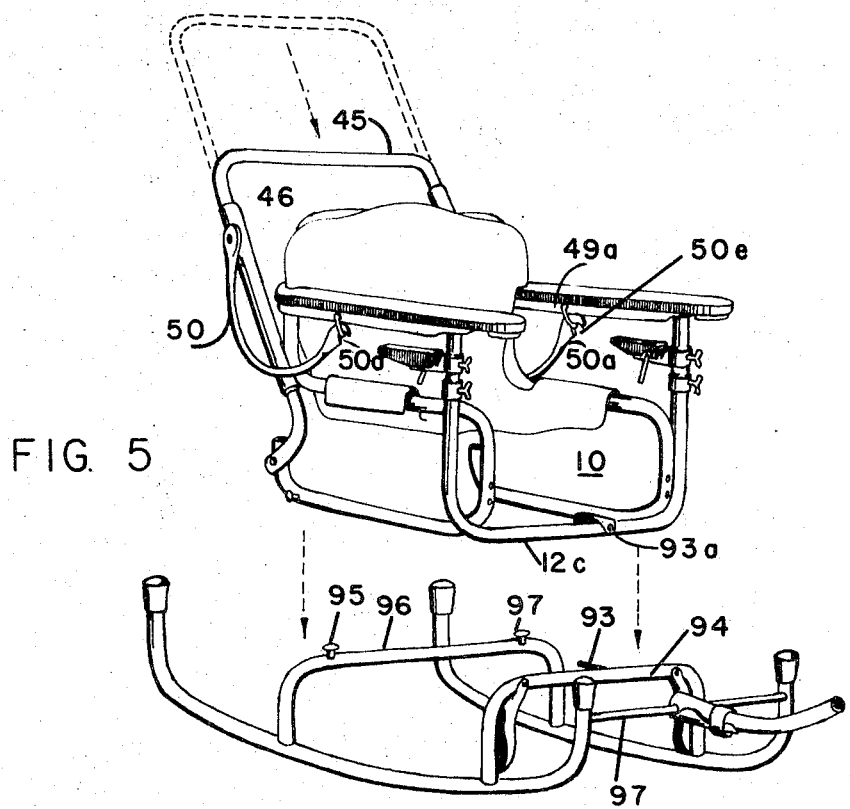
FIG. 5 illustrates the alternative base structure in an inverted position and adapted to receive the chair structure.

With reference to FIG. 5 the supporting base of FIG. 4 is shown in an inverted position. In addition to the structure shown in FIG. 4 there is provided on the now topside of the C-shaped element 96 the two capped pins 95 and 97 spaced apart thereon and fixedly secured thereto. Also on the C-shaped element 94 at a midpoint and extending inwardly there is fixedly positioned pin 93.

From the above described primary elements the functional adaption now becomes apparent, either with the seat element in itself or together with one or both of the other two primary elements. Referring again to FIG. 1 it can be seen that placing the precast (preferably plastic) seat 100 over the formed element 10, a baby seat is made. Specifically, the back 100a, of seat 100, fits over the top part 10b of the U-shaped portion of the structure 10, and the overlaps 100b and 100c fit over the horizontal arms 10a and 10c. The overlaps 100b and 100c can be of a slight underfit to have a force snap-in fit. To convert to a potty seat, the aperture 14 is cut in the seat and the pot 106 placed therebeneath. The cap 108 may be placed over the aperture when not in use.

With reference again to FIG. 2 it can be seen how the floor seat of FIG. 1 is converted to an infant's table chair. This is readily and easily accomplished by changing the back support from its horizontal position of FIG. 1 to its vertical position of FIG. 2. The arcuate arms 50 and 50a, by engaging their respective pins at 50d and 50e, locks the back support 40 in its vertical position. The seat is further "locked" to a table or similar structure by the locking means 112 and as more fully shown in FIGS. 11 and 11a, to which reference may now be had. The table is wedged between the underside of the tray 110 and the gripping side of the locking means 112. The locking means 112 comprises an elongated channel 113 and a second elongated channel 114 to interfit therewith. The channel 114 has four elongated slots 114b, 114c, 114d, and 114e (not seen) that are in alignment with the apertures 113a, 113b, 113c, and 113d (not seen). Pins 122 and 122a (not seen) join the two channels 113 and 114 together—but because of the elongated slots there is left an up and down region of movement. By turning the crank 116 the rubber-like stopper 120 rotatingly engaging the cross member thereof is forced upward to cause the channel 113 to engage the table. With the adjustment, as aforesaid with reference to FIG. 2, of the back support, the engagement can be made to be secure. Alternatively, the locking means 112 may be adjusted up and down by sliding the circular ring 114a positioned on the upright arm 12a. Once the adjustment is made the entire locking means 112 is fixedly positioned by the thumb screw 118 threadly engaged in aperture 118a and in contact with the arm 12a.

Referring now to FIG. 4 it can be seen that the seat 10 and back structure 40 is identical to and in the same arrangement as FIG. 2. The difference being that the locking means 112 is loosened and rotated out of position as aforesaid. In the arrangement of FIG. 4 the structure is made into a self-supporting high chair. The combination is very easily achieved by simply inserting the U-shaped elements 43a, 43b, 45, into and between supporting brackets 98 and 98a. These supporting brackets are shown more clearly in FIGS. 12 and 12a. When not in use the supporting brackets 98 and 98a are folded down over the cross bar C element 94 and held into position by the spring clasps 130 and 130a. When it is desired that the structure be made into a high chair the supporting brackets are lifted into a vertical position and are ready to receive the back support as aforesaid. To add rigidity and support, i.e., prevent the chair from rocking back and forth, the supporting brackets 98 and 98a have stamped out of their back side a prong 132. When completely vertical it can be seen that the prongs will be inserted in the aperture 133 formed in alignment therewith in the upright arms 94a and 94b of the C-shaped member 94. Again referring to FIG. 4, a footrest 138 may be added to the seat structure by inserting the pronglike supports 137 and 139 in apertures formed in the ends of the U-shaped elements 10a and 10b. Also the tray 110 is added to the seat as aforesaid.

Figure 8:
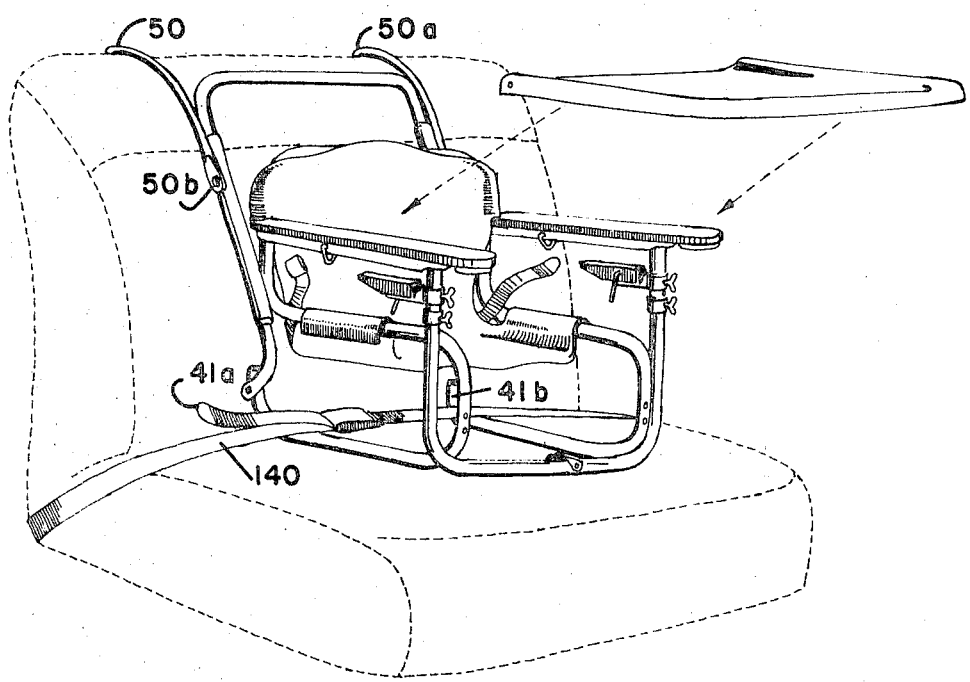
FIG. 8 illustrates another position of the supporting structure with the seat to form the car baby seat.

Referring now to FIG. 8 it can be seen that the exact structure of FIG. 1 is made into a car seat. Simply, the back support 40 is swung up and back on its pivots 41a and 41b and the arcuate arms 50a and 50b are also pivoted about its pivot points 50b and 50c. The entire seat is then placed over the back seat of the car—the arcuate arms 50 and 50a holding the seat in place. The conventional car seat 140 belt may then be utilized to further secure the car seat to the car.

Again, the exact structure shown in FIGS. 1 and 8 can be made into a rocker with the addition of the base of FIG. 5. The arcuate arms 50 and 50a are swung out of position and secured from further movement by engaging the hooks 50d and 50e to the loops 49 and 49a. The entire seat structure is placed over the base with the capped prongs 95 and 97 engaging the receiving apertures, as shown in FIGS. 9 and 9a, after the prong 93 has penetrated the shielded aperture 93a, shown in detail in FIG. 10b. Referring for the moment to FIGS. 9 and 9a the capped prongs 95 and 97 (of FIG. 5) are positioned on the C-shaped member to be in alignment with the receiving apertures 95a and 97a. The apertures 95a and 97a further include an elongated locking slot, such as shown by 97b. That is, the cap of the prongs fit into the aperture and then when the structure is pushed back the cap inside of the tubular member holds the structures together. To prevent the structures from coming apart there is provided a shield and locking mechanism in the base 12c of the front U-shaped member of the seat. In operation, the prong 93 is inserted through an aperture 93a in a thin metal shield 93b and the base 12c. The shield in this way is pivoted at this point to allow the hook 93c to engage the groove 93d formed in the prong 93—and hence lock the entire seat from back and forth (horizontal) movement.

Figure 5A:
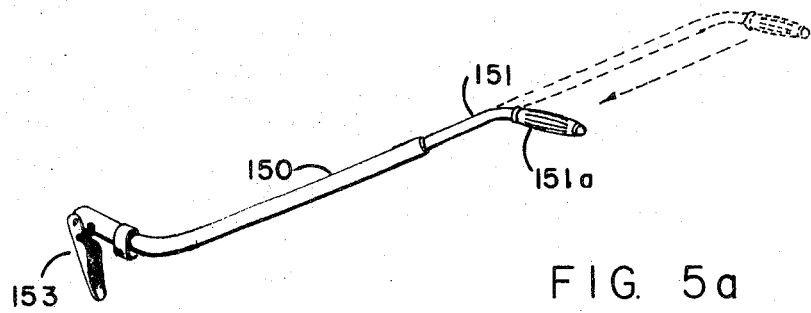
FIG. 5a illustrates a handle for converting a rocker into a sled.

To convert the rocker of FIG. 5 to an infant's seat sled, the handle 150 of FIG. 5a is added. The handle 150 includes an extended portion 151 that may be adjusted in length by adjusting means shown in FIG. 5c. Again the rod-like portion 151 is telescopingly inserted in the tubular portion 150 and locked into position by the threaded screw having an engaging end 155a.

Figure 5B:
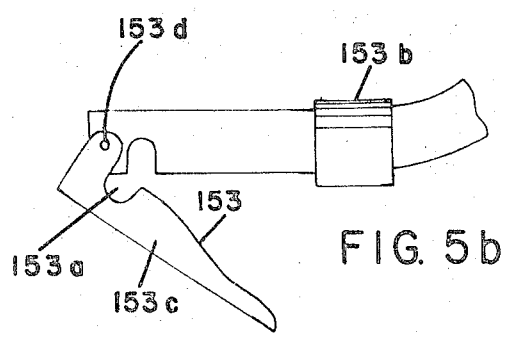
FIGS. 5b and 5c illustrate in detail component parts thereof.
Figure 5C:
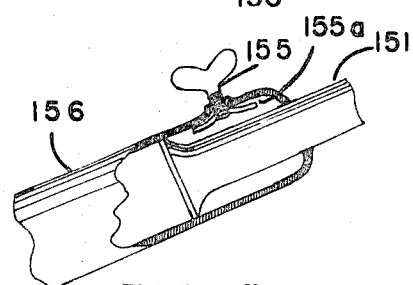

To lock the handle onto the cross member 97, locking means 153 is provided—referring now to FIG. 5b. There is comprised in this means a pivotal handle 153a pivoted about point 153d to and away from the end of the handle 150. When closed the grooves 153a formed in the locking means and the end of the handle receive and retain the cross member 97. By sliding the loop 153b over the pivotal handle 153 thereby retaining it in place. The primary U-shaped member 45 of the back structure 40 of FIG. 6 may be adjusted as aforesaid.

Figure 13A:
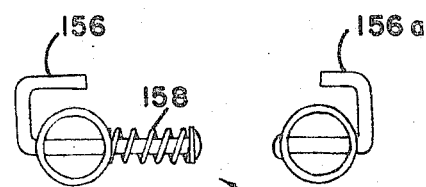
Figure 13:
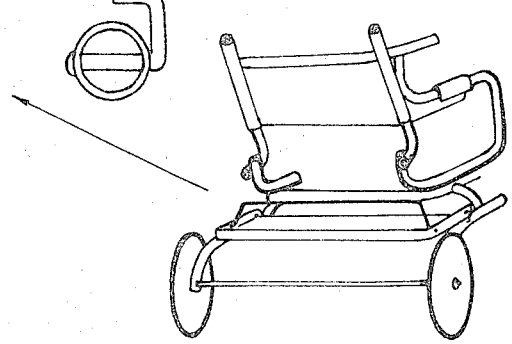
Figure 6:
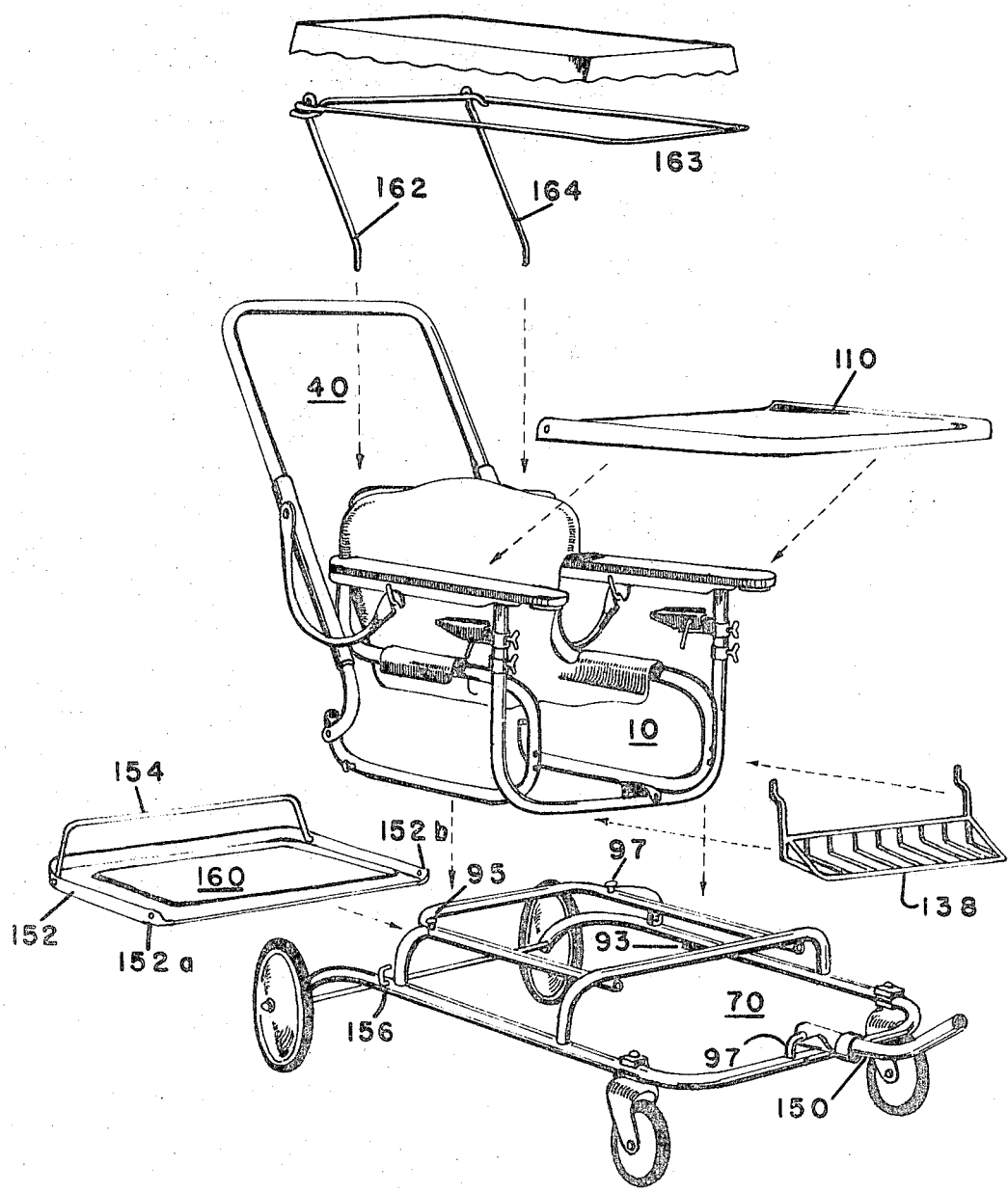
FIG. 6 illustrates certain of the auxiliary components that—with the three primary components—make up a baby stroller.

The identical seat structure 10 of FIG. 5 may be again utilized as a baby stroller as shown in FIG. 6. The seat is positioned on the base 70. That is, capped prongs 95 and 97 and pin 93 are utilized to retain the two structures together—further explanation would be redundant. To the assembly there may be added a luggage carrier 160. This carrier is retained by spring clips 156 and 156a positioned to be received by the apertures 152a and 152b in the upturned lips 152 of the carrier 160. To retain the clips 156 in place spring 158 urges the two—as shown in FIGS. 13 and 13a—clips together. The foot rest 138 and also the tray 110 may be added as aforesaid relative to FIG. 4. Hood 163 may also be added by inserting the supporting elements 162 and 164 into aligned receiving apertures or braces.

Figure 7:
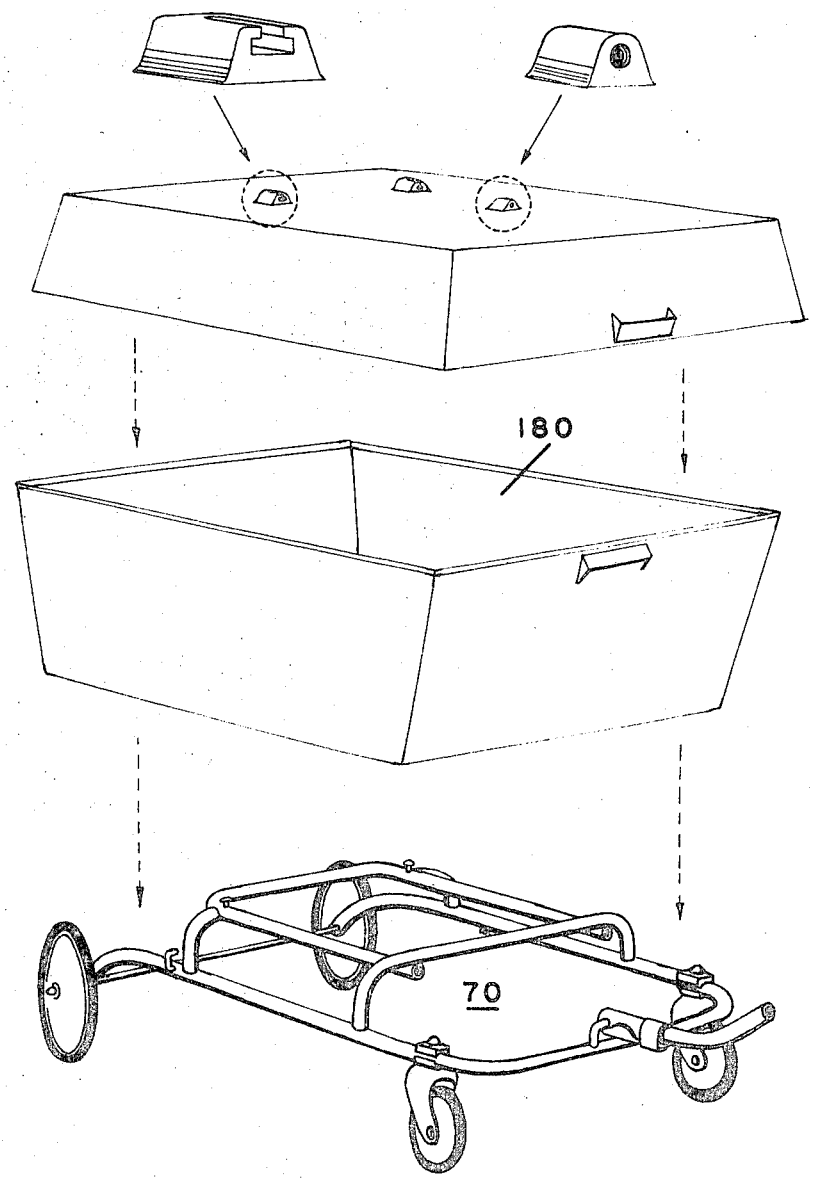
FIG. 7 illustrates a boxlike structure adapted to be fitted on the base structure to form a wagon or laundry cart.

Again with the identical base 70 of FIGS. 3, 6, and 7, there may be added the walker seat 172 to convert the base into a baby walker. Referring to FIG. 3 the support 170 for the seat is attached to the base in an identical manner as described relative to the rocker of FIG. 5 and the stroller of FIG. 6. Over the support 170 is placed a canvas or plastic type of snap on seat 172 (as shown in FIG. 3) to receive and hold the child.

In FIG. 7 the same base 70 is utilized in combination with the boxlike structure 180 to form a wagon or a laundry cart. Again, the two parts are joined in the same manner as above.

Although certain and specific embodiments have been illustrated, it is to be understood that modifications may be made without departing from the true spirit and scope of the invention.

What is claimed is:

1. An infant's convertible structure comprising the primary elements of a chair and a supporting structure, said chair comprising a first pair of U-shaped members positioned in a parallel relationship with the arms thereof horizontal and one over the other, a third U-shaped member in a vertical position, means for continuously joining said first pair of U-shaped members at the ends of the upper positioned arms thereof with the ends of the arms of said vertical U-shaped member, a fourth U-shaped member positioned vertically and at the closed ends of said first pair of parallel U-shaped means for joining said last-mentioned members, a seat, means for positioning said seat on the uppermost horizontal arms of said first pair of parallel U-shaped members and means for positioning said seat over the closed end of said first vertical U-shaped member, said supporting structure comprising an extended U-shaped member, means to pivotally join the open ends of said extended U-shaped member with the lowermost open ends of said first pair of U-shaped members, a pair of arcuate arms pivotally joined at one end thereof to said supporting structure, means to lock and unlock said arcuate arms at the other end thereof to one of said U-shaped members of said chair.

2. An infant's convertible structure as set forth in claim 1 wherein said arcuate arms are locked to said U-shaped member of said chair that are lowermost and provide said legs thereof to thereby lock said back structure in a right angle upright relationship with said chair.

3. An infant's convertible structure as set forth in claim 2 wherein said back structure U-shaped member further includes means for extending the arms thereof, thereby adjusting in height said upright chair.

4. An infant's convertible structure as set forth in claim 1 wherein said supporting structure is pivotally positioned away from the underside of said chair and rearwardly to the back side thereof and wherein said arcuate arms are locked to one of said upper U-shaped members.

5. An infant's convertible structure as set forth in claim 4 further comprising a fifth U-shaped member and means for positioning the closed end thereof at a midpoint—and at right angles therewith—on said vertical third U-shaped member providing the back of said chair.

6. An infant's convertible structure as set forth in claim 4 wherein said arcuate arms are pivotally positioned upwardly and away from said U-shaped members to thereby form a supporting rest for said chair.

7. An infant's convertible structure as set forth in claim 5 further comprising in said chair a fifth U-shaped member having its curved ends fixedly positioned at an intermediate point on said vertical third shaped member forming the back of said chair, and wherein said fifth U-shaped member, includes means for securing ends of said fifth U-shaped member to ends of a said fourth upright U-shaped member, a tray, means for positioning said tray on said fifth U-shaped member.

8. An infant's convertible structure as set forth in claim 5 wherein there is further provided on said upright fourth U-shaped member a pair of adjustable gripping means, said gripping means rotatably adjustable and positioned sufficiently near the ends of said fourth U-shaped member to permit the entry of a table top between said gripping means and said fifth U-shaped member, and actuating means on said gripping means operative to grip said top in a secure manner.

9. An infant's convertible structure as set forth in claim 1 further comprising primary base element, said base element comprising a first and second pair of C-shaped members, means for joining the open ends of said first pair of C-shaped members to the underside of the second pair of C-shaped members, means positioned on the outside curvature side of said first pair of C-shaped members, means positioned on the underside of the lowermost arms of said first pair of parallel horizontal U-shaped arms of said chair, said last-mentioned two means in alignment and adapted to securely interlock.

10. An infant's convertible structure as set forth in claim 9 wherein said base element further comprises means for vertically supporting said supporting structure, said last-named supporting means comprising a pair of supporting brackets positioned adjacent the inside curvature of said first pair of C-shaped members, said brackets having a spacing therebetween to snugly receive the outside curvature side of said extended U-shaped member supporting structure.

11. An infant's convertible structure as set forth in claim 10 wherein said pair of supporting brackets are pivotally joined to said C-member and adapted to fit over said C-member when not in use, said brackets further comprising retaining means to secure said brackets in an upright position when in use and thereby prevent said supporting structure from movement.

12. An infant's convertible structure as set forth in claim 11 further comprising means for locking said arcuate arms to said fifth U-shaped member of said chair to maintain said supporting structure in a substantially turned-up position.

13. An infant's convertible structure as set forth in claim 1 further comprising another primary base element including a sixth and seventh U-shaped member horizontally positioned with their open ends in opposite directions, a C-shaped member joining the open ends of said sixth U-shaped member to the curvature end of said seventh U-shaped member, and supporting means on the opposite ends of said sixth and seventh U-shaped members for maintaining a rigid parallel relationship therebetween.

14. An infant's convertible structure as set forth in claim 13 further comprising means positioned on the outside curvature of said sixth U-shaped member, means positioned on the underside of the lowermost arms of said first pair of parallel horizontal U-shaped arms of said chair, said last-mentioned two means in alignment and adapted to securely interlock.

15. An infant's convertible structure as set forth in claim 13 further comprising a first pair of wheels, means for rotatively joining said first pair of wheels to the ends of said seventh U-shaped member; a second pair of wheels, and supporting means connected to the opposite ends of said seventh U-shaped member for rotatively joining therewith.

16. An infant's convertible structure as set forth in claim 9 further comprising an elongated handle means having a gripping portion at one end thereof and locking means at the opposite end thereof, said locking means adapted to lock into one of said C-shaped members.

17. An infant's convertible structure as set forth in claim 13 further comprising an elongated handle means having a gripping portion at one end thereof and locking means at the opposite end thereof, said locking means adapted to lock onto one of said U-shaped members.

References Cited

UNITED STATES PATENTS

| | | | |
|---|---|---|---|
| 2,689,598 | 9/1954 | Pollack et al. | 297—134 |
| 2,971,567 | 2/1961 | Kimmel | 297—134 |
| 3,115,365 | 12/1963 | Hershberger | 297—133 |
| 3,223,431 | 12/1965 | Gottfried | 297—134 |
| 3,269,771 | 8/1966 | Erdos | 297—132 |
| 3,271,784 | 9/1966 | Peffley | 297—254 |
| 3,288,482 | 11/1966 | Gottfried | 297—134 |

REINALDO P. MACHADO, Primary Examiner

U.S. Cl. X.R.

297—148, 254, 423